United States Patent

Miln et al.

Patent Number: 5,254,649
Date of Patent: Oct. 19, 1993

[54] CATIONIC POLYMERIZATION OF 1-OLEFINS

[75] Inventors: Colin D. Miln, Edinburgh; Douglas Stewart, Central Region, both of Scotland

[73] Assignee: BP Chemicals Limited, London, England

[21] Appl. No.: 619,299

[22] Filed: Nov. 28, 1990

[51] Int. Cl.$^5$ ............ C08F 4/16; C08F 10/10
[52] U.S. Cl. .................... 526/221; 526/207; 526/208; 526/209; 526/210; 526/213; 526/214; 526/237; 526/290; 526/348.7; 585/530
[58] Field of Search ........ 526/221, 237, 348.7, 526/209, 208, 207, 210, 212, 213, 214; 585/506, 530; 502/169

[56] References Cited

U.S. PATENT DOCUMENTS 2,085,535  6/1937  Langedijk et al. ......... 526/221 X
2,314,911  3/1943  Trepp ............................. 526/221

FOREIGN PATENT DOCUMENTS 0265053  4/1988  European Pat. Off. ......... 526/237

OTHER PUBLICATIONS

Norrish et al., "Friedel-Crafts Catalysts in Polymerization," Nature, 160, 543-544 (1947).

Primary Examiner—Fred Teskin
Attorney, Agent, or Firm—Brooks Haidt Haffner & Delahunty

[57] ABSTRACT

This invention relates to a process for producing a polymer predominating in terminal unsaturation by cationically polymerising a 1-olefin in the liquid phase at a temperature from −100° to +100° C. in the presence of a catalyst composition comprising tin tetrachloride and a co-catalyst which is a source of cations and which is substantially free of organometallic compounds. The process is particularly suited to producing polybutenes having high vinylidene content which have high reactivity, especially towards forming maleic anhydride adducts.

15 Claims, No Drawings

CATIONIC POLYMERIZATION OF 1-OLEFINS

The present invention relates to a process for cationic polymerisation of 1-olefins to an olefin polymer, and in particular to producing polyisobutenes which have a relative high degree of vinylidene groups.

Isobutene is a typical example of a 1-olefin. Methods of polymerising 1-olefins, e.g. isobutenes whether pure or in an isomeric mixture as in a $C_4$ raffinate, using a Friedel-Crafts type catalyst are well-known. Typical of such catalysts are the halides of aluminium, iron, zinc, titanium, mercury and boron. These catalysts have also been used in conjunction with small amounts of co-catalysts such as water, alcohol, sulphur dioxide, carboxylic acids, mineral acids, ethers and alkyl halides to enhance catalyst activity. The reaction has been carried out in the liquid or gaseous phases, batchwise or continuously, at temperatures ranging from $-100°$ to $+100$ C.

It is also known that the polymerisation of 1-olefins e.g. isobutene using a Friedel-Crafts type catalyst is a cationic process which proceeds through formation of intermediate carbonium ions.

The product of this reaction is generally a mixture of polymers which have the unsaturated linkage in the terminal or internal position within the polymer. Conventional cationic processes generally yield a polymer with a relatively high proportion of internal unsaturation compared with polymers having vinylidene groups. This is due to the "in situ" isomerisation of the unsaturated linkage to an internal position and is inherent in most cationic polymerisation processes. Internal unsaturation in olefin polymers is believed to be less desirable than terminal unsaturation of the vinylidene type because of the relatively lower chemical reactivity of internally unsaturated polymers when compared with polymers having vinylidene groups. This is especially true of the reactivity towards compounds such as maleic anhydride which forms an adduct with polyisobutene called polyisobutenyl succinic anhydride (PIBSA). These adducts are most valuable products and form the basis of the lubricating oil additives industry.

Of the cationic polymerisation catalysts used hitherto those containing boron trifluoride are known for their tendency to isomerise the unsaturation in the polymer product to an unreactive internal position. For instance, Puskas, I. et al in Journal of Polymer Science, Symposium No. 56. pp 191-202 (1976) have reviewed the relative effects of catalysts such as boron trifluoride and complexes thereof with co-catalysts such as acetic acid and water. In this article, the authors indicate that up to 40% vinylidene (i.e. terminal) unsaturation can be obtained with a contact time of 5-7 minutes. They conclude however that the longer the contact time the greater is the tendency for the vinylidene unsaturation in the polymer to be isomerised to a unreactive internal position.

This view also appears to be confirmed indirectly in an article by Mullin, M. A. et al in Khim i Tekhnol. Topliv i masel, vol 10, pp 23-26 (October 1965) in which a complex of boron trifluoride with methanol or a mixture of methanol and ethanol is disclosed as a catalyst for polymerising isobutene. This article discloses a very short contact time of 30-40 seconds which is indicative of the care necessary when using this catalyst.

The criticality of a short time in relation to the use of boron trifluoride catalyst for polymerising isobutene is also emphasised in GB 1592016 and EP-A-16312. The latter publication advocates vigorous control of contact time and catalyst concentration and stresses the need to have a contact time of below 40 seconds to avoid isomerisation of the double bonds.

In U.S. Pat. No. 3066123 (ESSO) it is stated (in col.1, line 33-34 and col.2, line 8-15) that Friedel Crafts catalysts such as $SnCl_4$ when employed alone are completely ineffective in Ziegler type catalysis for polymerising olefins such as isobutylene. This patent goes on to state (col.2, line 16-18) that the activating material "must" be an aluminium alkyl compound which has been found to be "absolutely essential" in the combination although ineffective alone.

This view is further substantiated in an authoritative text by Kennedy, J P and Gillham, J K in Advances in Polymer Science vol 10, 1972, p.4 where they state that "Minckler et al (11,12) successfully used $Al(C_2H_5)_3$ to activate such conventional Friedel-Crafts catalysts as $SnCl_4$ which alone is inactive for isobutylene polymerisation and propylene oligomerisation".

It has now been found that a product predominating in terminal unsaturation of the vinylidene type can be formed without using a catalyst composition which contains either boron trifluoride or an organometallic compound such as an aluminium alkyl (halide).

Accordingly, the present invention is a liquid phase process for the cationic polymerisation of a feedstock comprising 1-olefins to a polymer predominating in terminal unsaturation at a temperature from $-100°$ to $+100°$ C. in the presence of a catalyst composition comprising tin tetrachloride catalyst and a co-catalyst which is a source of cations which is substantially free of organometallic compounds.

The term 'polymerisation' as used herein is intended to cover oligomerisation and the process is particularly suited to the production of oligomers such as dimers and trimers, and low molecular weight polymers of 1-olefins wherein the number average molecular weight (Mn) of the polymer may be from 100 to 15,000.

The hydrocarbon feedstock may be pure 1-olefin or a mixed feed containing the 1-olefin. 1-olefin feedstock containing 4 to 16 carbon atoms is preferred. If a pure olefin is used, which is gaseous under ambient conditions, it is necessary either to control the reaction pressure and/or temperature, or to dissolve the olefin in a solvent medium inert under the reaction conditions in order to maintain the olefin in the liquid phase. In the case of isobutene which is typical of 1-olefins, the feedstock used in the polymerisation process may be pure isobutene or a mixed $C_4$ hydrocarbon feedstock such as that resulting from the thermal or catalytic cracking operation conventionally known as a butadiene raffinate (hereafter BDR). This is a liquid when under pressure and hence no diluent is needed. The feedstock used may suitably contain between 10 and 100% by weight of isobutene. It is preferable to use a feedstock containing at least 15% by weight of isobutene and most preferably at least 40% by weight of isobutene. The hydrocarbon feedstock used may contain in addition to isobutene between 10 and 20% by weight of butanes and/or between 20 and 40% by weight of normal butenes without adverse effect on the polyisobutene product.

The catalyst is tin tetrachloride (hereafter TTC) activated by a co-catalyst which is a source of cations substantially free of organometallic compounds such as alkyl aluminium (halide).

The cocatalyst which may be used as a source of cations in the process of the present invention include for instance:

a) mineral acids such as phosphoric acid, hydrochloric acid, hydrofluoric acid, hydrobromic acid, hydrogen iodide, sulphuric acid and nitric acid;

b) organic acids such as formic acid, acetic acid, propionic acid, butyric acid and its isomers, monochloro-, dichloro-, trichloro-, perchloro-, monofluoro-, difluoro- and trifluoro- acetic acids, trifluorosulphonic acid, oxalic acid, succinic acid, malic acid, crotonic acid, benzoic acid and phenyl acetic acid;

c) organic alkyl halides such as methyl-, ethyl-, normal and iso-propyl-, normal and iso-butyl-, tertiary butyl-, triphenylmethyl-, benzyl-, hexyl-, allyl, methallyl-, heptyl-, octyl- and decyl-chlorides;

d) hydroxyl compounds such as water, methanol, ethanol, normal-and iso-propanols, normal- and iso-butanols, triphenylmethanol, pentanol, hexanol, heptanol, octanol, decanol, glycol and phenol;

e) anhydrides such as acetic acid anhydride;

f) ethers such as diethyl-, dipropyl-, dibutyl-, ethyl propyl-, diamyl- and propyl butyl-ethers, and diethyl ether of glycol;

g) aliphatic esters such as ethyl formate, methyl formate, propyl formate, methyl acetate, ethyl acetate, propyl acetate, methyl propionate, ethyl propionate and propyl propionate; and h) carbonyl compounds such as acetone, methyl ethyl ketone, methyl butyl ketone and benzaldehyde.

No claim is made herein to catalyst compositions containing any significant amount of organometallic compounds such as alkyl aluminium (halide) of the type $R_nAlX_{3-n}$ where n=0 to 3 in addition to the TTC and co-catalyst. By "significant amounts" is meant here and throughout the specification that addition of trace amounts, e.g. of the order of 0.01% or more based on the TTC, of organometallic compounds is discounted and does not form part of the present invention.

In the catalyst compositions of the present invention the molar ratio of TTC to the co-catalyst is suitably from 10:1 to 1:10, preferably from 7:1 to 1:3 and most preferably from 5:1 to 1:2.

Catalyst and co-catalyst components used in the present invention may be prepared by conventional techniques or can be bought commercially as proprietary products. However, it is desirable to analyse any commercial products to ensure adequate control of the concentrations of the relevant components in the polymerisation reaction.

The components so formed are then diluted with a solvent inert under the reaction conditions, e.g. dichloromethane or n-heptane. The components are suitably dissolved in dry, anhydrous solvents in the case of TTC and TBC. If water is used as the co-catalyst no solvent is required for this component.

The polymerisation reaction is carried out in the liquid phase. The catalyst components are suitably introduced into the polymerisation reactor as a solution thereof in a solvent which is inert under the reaction conditions. The use of a solvent for the catalyst components is only necessary to ensure a more effective control of the concentration of the catalyst composition. The catalyst and cocatalyst solutions can either be added simultaneously or sequentially, preferably simultaneously, into the polymerisation reaction. However, it is possible to use the neat components of the catalyst composition as such. Examples of suitable solvents include primary and secondary alkyl halides and aliphatic, alicyclic and cycloaliphatic hydrocarbons. Dichloromethane and n-heptane are typical examples of the solvent.

One of the surprising features of the present invention is that in spite of using TTC as a catalyst component, there is no need to use as cocatalyst an organometallic compound such as aluminium alkyl (halide), hitherto believed to be essential in such a system, to achieve polymerisation. It is even more surprising that the product of the polymerisation reaction, especially in the case of polybutenes (whether poly-n-butene, polyisobutene or mixtures thereof), has an average vinylidene unsaturation content of at least 60%, which is the most desirable distribution. A further surprising feature of the present invention is that, unlike catalyst compositions containing boron trifluoride, there is no risk of isomerisation of the terminal unsaturation in the product by prolonged contact with the catalyst; the product is predominantly a terminally unsaturated polymer irrespective of the duration of the polymerisation reaction which is typically about 30 minutes. This is a significant feature because such a polymer is easy to react efficiently e.g. with maleic anhydride to form poly(iso)-butenyl succinic anhydride (hereafter "PIBSAII"), a valuable raw material for producing the corresponding imines which are used as additives to lubricating oils, gasoline and fuels.

The polymerisation reaction is suitably carried out at a temperature between −50° and +45° C., preferably between −20° and 40° C. The reaction may be carried out at a pressure in the range of 0.4 to 4 bar absolute. The process of the present invention is particularly suitable for producing polyisobutenes having a molecular weight of between 500 and 5000, even more preferably those having a molecular weight of between 750 and 3500. The significantly high proportion of terminal unsaturation in the polymers so produced are particularly suited for producing adducts with maleic anhydride which are eventually converted to the imides by reaction with appropriate amines for use as additives to lubricating oils.

The process of the present invention may be operated batchwise or continuously.

The present invention is further illustrated with reference to the following examples.

| Feedstock Composition | |
|---|---|
| Component | % |
| Isobutane | 3.87 |
| n-Butane | 16.97 |
| Butene-1 | 21.93 |
| Isobutene | 41.67 |
| cis-Butene-2 | 10.6 |
| trans-Butene-2 | 4.96 |

Catalyst Preparation-General Method

The desired amount of anhydrous catalyst is added to a standard flask which has been purged with nitrogen ($N_2$). Solvent (either dry n-heptane or dry dichloromethane) is then added in the required amount to produce a standard solution. Both catalyst and co-catalyst are prepared in this manner.

General Polymerisation Procedure

The reactor system used was a batch reactor and consisted of a sealed flask provided with means for stirring, and inlets for the reactant olefin to be polymerised, the catalyst components and for an inert gas to be introduced into the system. The system was also provided with a means for controlling and for measuring the reaction temperature.

Having assembled the appropriate system, a continuous nitrogenpurge was introduced and remained throughout the reaction. Solvent (either dry n-heptane or dry dichloromethane), 500cm$^3$, was added to the reactor followed by BDR feedstock added as a liquid from a pressurised bomb.

Once equilibration of the system had occurred and a constant temperature produced, catalyst and co-catalyst were then added separately at a controlled rate over a twenty minute period. Temperature was monitored consistently throughout this addition. A further ten minutes reaction time was then allowed.

Following this period, the reaction was terminated by using catalyst poison consisting of approximately 150cm$^3$ of a 1:1 volume ratio of 0.88M ammonia solution in water was added. The work-up procedure consisted of three washings with water (total volume approximately 500cm$^3$), followed by removal of the organic layer.

The organic layer was first filtered using 1.2 micrometer glass fibre paper filters and then heated under reduced pressure to remove solvent (10 mmHg, 130° C.) and light polymer (1 mmHg, 220° C.).

EXAMPLE 1

This example involved the use of tin tetrachloride and t-butyl chloride to give a polybutene having a vinylidene content of 92% with 16.7% conversion as shown in Table 1 below:

Catalyst preparation:1.076M solution of tin tetrachloride in dry n-heptane was added.
Co-catalyst preparation:1.010M solution of t-butylchloride in dichloromethane was added.
Reaction Method:Dichloromethane was used as the reactor solvent 328 g of BDR feedstock was added.
Feedstock Analysis:As shown previously.

The information given below indicates the change of temperature as the reaction progressed.

| Time/ minutes | Reactor Temperature/°C. | Catalyst Solution added | Total volume of co-catalyst solution added |
|---|---|---|---|
| 0 | 6 | 0 cm$^3$ | 0 cm$^3$ |
| 5 | 7 | 4.5 | 6.0 |
| 10 | 10 | 10.0 | 9.6 |
| 15 | 11 | 13.0 | 12.5 |
| 20 | 12 | 17.7 | 15.2 |
| 25 | 12 | 21.0 | 18.5 |
| 30 | 12 | 21.0 | 21.0 |

EXAMPLE 2

This example involved the use of tin tetrachloride and tap water to give a polybutene having a vinylidene content of 90% with a 32% conversion as shown in Table 1 below:

Catalyst preparation:0.987M solution of tin tetrachloride in dry n-heptane was added.
Co-catalyst preparation:Water was added neat.
Reaction method:Dichloromethane was used as the reactor solvent. Water was added prior to the addition of the BDR feedstock in one single injection 156 g of BDR was added.
Feedstock Analysis:As shown previously.

The change of temperature with time is indicated below:

| Time/Minutes | Reactor Temperature/°C. | Total volume of catalyst solution added/cm$^3$ |
|---|---|---|
| 0 | 5 | 0 |
| 5 | 6 | 3.0 |
| 10 | 7 | 11.0 |
| 15 | 9 | 18.0 |
| 20 | 11 | 21.0 |
| 25 | 13 | 21.0 |
| 30 | 15 | 21.0 |

EXAMPLE 3

This example involved the use of tin tetrachloride and t-butyl chloride to give a polybutene having vinylidene content of 87% with a 30.2% conversion as shown in Table 1 below:

Catalyst preparation:1.076M solution of tin tetrachloride in dry n-heptane was added.
Co-catalyst preparation:1.010M solution of t-butyl chloride in dichloromethane was added.
Reaction Method:Dichloromethane was used as the reactor solvent. 215 g of BDR feedstock was added.
Feedstock Analysis:As shown previously.

EXAMPLES 4–7

These examples were carried out under the same conditions as in Example 1 above except for minor variations catalyst, co-catalyst and solvent concentrations. These variations and results achieved are summarised in Table 1 below.

COMPARATIVE TEST 1 (NOT ACCORDING TO THE INVENTION)

This Test was carried out under the same conditions as in Example 1 above except that TiCl$_4$ was used as catalyst. This and any other minor differences in concentrations or conditions used together with the results achieved are shown in Table 1 below.

COMPARATIVE TEST 2 (NOT ACCORDING TO THE INVENTION)

This Test was carried out under the same conditions as in Example 2 above except that TiCl$_4$ was used as the catalyst and no solvent was used either with the catalyst or co-catalyst. This and any other minor variations together with the results achieved are shown on Table 1 below.

COMPARATIVE TEST 3 (NOT ACCORDING TO THE INVENTION)

This Test was carried out under the same conditions as in Comparative Test 1 above except that trichloroacetic acid was used as co-catalyst in dry n-heptane. These variations and the results achieved are shown in Table 1 below.

The results of all the above Examples and Comparative Tests are tabulated in Table 1 below. In the Table $$\% \text{ Conversion} = \frac{\text{Mass Polymer Obtained}}{\text{Mass of BDR fed} \times 41.67\%} \times 100$$

CT = Comparative Test (not according to the invention)

TABLE 1

| No. | Catalyst | Catalyst Solvent (Molarity) | Catalyst (Moles) | Co-catalyst | Co-catalyst Solvent (Molarity) | Co-catalyst (Moles) | Mass of BDR Added (g) | Initial Temp. °C. | Reactor Solvent | Conv. % | Mol Wt (Mn) | % Vinylidene in polymer |
|---|---|---|---|---|---|---|---|---|---|---|---|---|
| 1 | $SnCl_4$ | Dry n-heptane (1.076) | 0.023 | TBC | $CH_2Cl_2$ (1.010) | 0.021 | 328 | 6 | $CH_2Cl_2$ | 17 | 1185 | 92 |
| 2 | $SnCl_4$ | Dry n-heptane (0.987) | 0.021 | $H_2O$ | None | 0.003 | 156 | 5* | $CH_2Cl_2$ | 32 | 972 | 90 |
| 3 | $SnCl_4$ | Dry n-heptane (1.076) | 0.023 | TBC | $CH_2Cl_2$ (1.010) | 0.021 | 215 | −20* | $CH_2Cl_2$ | 30 | 3442 | 87 |
| 4 | $SnCl_4$ | Dry n-heptane (1.011) | 0.021 | TBC | $CH_2Cl_2$ (1.001) | 0.021 | 205.1 | 8 | $CH_2Cl_2$ | 15 | 814 | 82 |
| 5 | $SnCl_4$ | Dry n-heptane (0.987) | 0.059 | TBC | $CH_2Cl_2$ (1.001) | 0.021 | 201.2 | 9 | $CH_2Cl_2$ | 49 | 1422 | 81 |
| 6 | $SnCl_4$ | Dry n-heptane (1.011) | 0.020 | TBC | $CH_2Cl_2$ (1.001) | 0.051 | 101.3 | 10 | $CH_2Cl_2$ | 40 | 805 | 80 |
| 7 | $SnCl_4$ | Dry n-heptane (1.006) | 0.092 | TBC | $CH_2Cl_2$ (1.036) | 0.022 | 163.4 | 5 | $CH_2Cl_2$ | 53 | 1152 | 77 |
| CT1 | $TiCl_4$ | Dry n-heptane (0.962) | 0.019 | TBC | $CH_2Cl_2$ (1.026) | 0.021 | 357.1 | 9 | $CH_2Cl_2$ | 12 | 1270 | 60 |
| CT2 | $TiCl_4$ | None | 0.027 | $H_2O$ | None | 0.003 | 204.0 | 14* | Dry n-heptane | 36 | 1898 | 55 |
| CT3 | $TiCl_4$ | Dry n-heptane (0.997) | 0.030 | $CCl_3CO_2H$ | Dry n-heptane (1.000) | 0.030 | 270.4 | 15* | Dry n-heptane | 19 | 1301 | 50 |

The change of temperature with time is indicated below:

| Time/minutes | Reactor Temperature/°C. | Bath Temperature/°C. | Total volume of Catalyst solution added | Total volume of Co-catalyst solution added |
|---|---|---|---|---|
| 0 | −20 | −20 | 0 cm³ | 0 cm³ |
| 5 | −20 | −20 | 4.5 | 8.0 |
| 10 | −19 | −19 | 8.5 | 10.5 |
| 15 | −16 | −19 | 14.5 | 16.2 |
| 20 | −14 | −20 | 18.0 | 21.0 |
| 25 | −11 | −18 | 21.0 | 21.0 |
| 30 | −11 | −20 | 21.0 | 21.0 |

Evidence of no influence reaction time:

| | Initiator (No of moles) | Co-initiator (No of moles) | Temp. degrees C. | Residence Time/mins. | % Vinylidene content |
|---|---|---|---|---|---|
| Example 8 | TTC (0.023) | TBC (0.021) | 6 | 30 | 92 |
| Example 9 | TTC (0.023) | TBC (0.021) | 8 | 15 | 89 |
| Example 10 | TTC (0.021) | $CCl_3$ COOH (0.020) | 0 | 10 | 61 |

*This recorded temperature was taken prior to the addition of the B.D.R. feedstock.
Note: $CCl_3$ COOH is Trichloroacetic acid (AR grade ex-Fisons).

We claim:

1. A process for the cationic polymerization of a feedstock containing a 1-olefin which comprises polymerizing a 1-olefin in the liquid phase at a temperature from −100° to 100° C. in the presence of a catalyst composition comprising tin tetrachloride and an organic halide co-catalyst which is a source of cations which is substantially free of organometallic compounds to obtain a polymer predominating in terminal unsaturation.

2. A process according to claim 1 wherein the 1-olefin feedstock has 4–16 carbon atoms.

3. A process according to claim 1 wherein the olefin feedstock comprises isobutene.

4. A process according to claim 1 wherein the olefin feedstock is a butadiene raffinate.

5. A process according to claim 1 wherein the catalyst composition comprises tin tetrachloride and the co-catalyst in a molar ratio of 10:1 to 1:10.

6. A process according to claim 1 wherein the reaction temperature is from −50° to +45° C.

7. A process according to claim 1 wherein the reaction is carried out at a pressure from 0.4 to 4 bar absolute.

8. A process according to claim 1 wherein the olefin polymer has a number average molecular weight (Mn) from 100 to 15000.

9. A process as defined in claim 1, wherein the cation source is an organic halide selected from the group consisting of methyl-, ethyl-, normal and iso-propyl-, normal and iso-butyl-, tertiary butyl-, triphenylmethyl-, benzyl-, hexyl-, allyl-, methallyl-, heptyl-, octyl- and decyl- chloride.

10. A process as defined in claim 1, wherein the feedstock contains isobutene and the polymer obtained has an average vinylidene content of at least 60%.

11. A process as defined in claim 9, wherein the cocatalyst is an alkenyl halide.

12. A process as defined in claim 9, wherein the cocatalyst is allyl or methallyl chloride.

13. A process as defined in claim 9, wherein the organic halide is an aryl halide.

14. A process as defined in claim 9, wherein the aryl halide is triphenylmethyl chloride or benzyl chloride.

15. A process for the cationic polymerization of a feedstock containing a 1-olefin which comprises polymerizing a 1-olefin in the liquid phase at a temperature from $-100°$ to $100°$ C. in the presence of a catalyst composition comprising tin tetrachloride and an organic alkyl halide co-catalyst selected from the group consisting of methyl-, ethyl-, normal propyl-, isopropyl-, normal butyl-, iso-butyl- and tertiary butyl-, hexyl-, heptyl-, octyl- and decyl-chloride.

* * * * *

UNITED STATES PATENT AND TRADEMARK OFFICE
CERTIFICATE OF CORRECTION

PATENT NO. : 5,254,649
DATED : October 19, 1993
INVENTOR(S) : COLIN D. MILN and DOUGLAS STEWART It is certified that error appears in the above-indentified patent and that said Letters Patent is hereby corrected as shown below:

Col. 4, 1. 28, should read "(hereafter "PIBSA")"

Signed and Sealed this

Third Day of May, 1994

Attest:

BRUCE LEHMAN

Attesting Officer

Commissioner of Patents and Trademarks